Aug. 21, 1928.  1,681,774
F. W. LEE ET AL
ALTERNATING CURRENT SWITCH
Filed Oct. 24, 1925  2 Sheets-Sheet 1
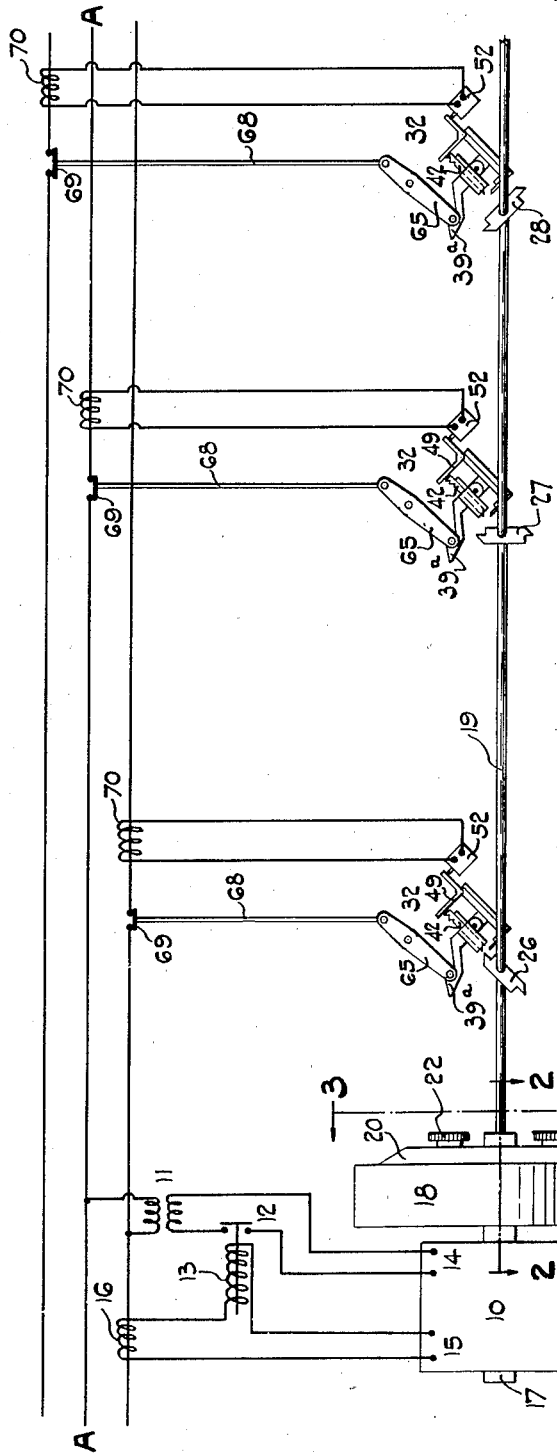
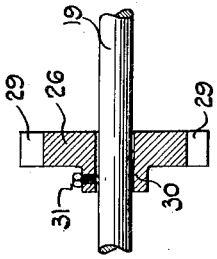
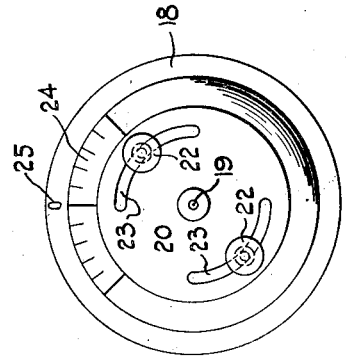
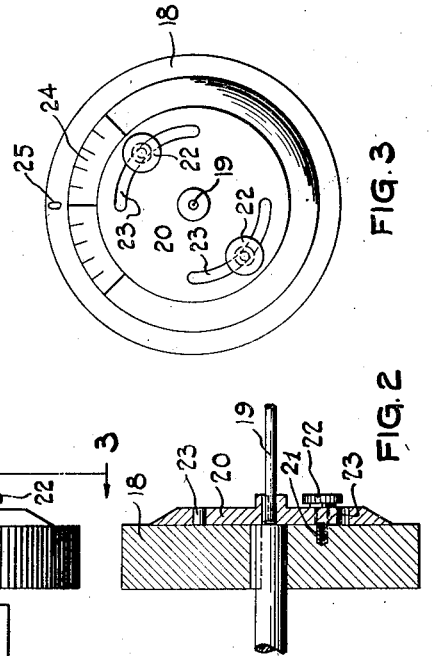
INVENTORS.
FREDERICK W. LEE
MYRICK W. PULLEN
BY
*Leon Edelson*
ATTORNEY.

Aug. 21, 1928.  1,681,774

F. W. LEE ET AL

ALTERNATING CURRENT SWITCH

Filed Oct. 24, 1925  2 Sheets-Sheet 2

INVENTORS.
FREDERICK W. LEE
MYRICK W. PULLEN
BY Leon Edelson
ATTORNEY.

Patented Aug. 21, 1928.

1,681,774

UNITED STATES PATENT OFFICE.

FREDERICK W. LEE, OF OWINGS MILLS, AND MYRICK W. PULLEN, OF TOWSON, MARYLAND, ASSIGNORS OF ONE-FOURTH TO LEON EDELSON, OF PHILADELPHIA, PENNSYLVANIA.

ALTERNATING-CURRENT SWITCH.

Application filed October 24, 1925. Serial No. 64,484.

This invention relates in general to alternating current switches and more particularly to the breaking and establishment of periodic and alternating current circuits without the formation of objectionable transient effects.

It is a well known fact to those familiar with the art that transients and other disturbances may arise when a current is made or interrupted at a certain specified point or time of a cycle. This interruption of current may cause the liberation of too much energy at the point of interruption causing great damage to the switching or other apparatus, and besides it may cause the formation of objectionable transients in adjacent circuits. On the other hand, when the circuit is closed there may be caused sudden rushes of current and an accompanying transient which may be as objectionable as when the circuit was suddenly interrupted.

All alternating current circuits have, in a sequence of a period, instances at which the current passes through zero, or in other words, instances when there is no current whatever in the circuit. If the current should be interrupted at either of those points of zero current flow there would be entailed no arcing at the contacts and no disturbances in the circuit.

From the foregoing it will appear that it is an object to select the time of opening of the circuit to be at or very near the points of zero current, thereby causing no disturbance in the circuit whatever. Not only this, but it is our further object to interrupt the circuit at any specified time or part of the current cycle other than the zero points heretofore mentioned, this, for the reason, that circuits when once established have a certain point in the cycle when the transient disappears and if the circuit were interrupted at the proper time (at the instance of transient disappearance) there would be no objectionable disturbance created in the system.

Having these main objects in mind, another object of our invention is the provision of one or more mechanisms for automatically insuring the making or breaking of the circuit in one or more phases thereof at any desired instant.

Still another object is the provision of an operator for said mechanism to impart thereto definite sequences of mechanical position which bear a direct relation to the phase of the current to be operated upon.

Still another object is the provision of an adjustable timing device adapted to compensate simultaneously for any time lag of the several members which control said mechanisms, this compensating device being provided in addition to means for separately and individually adjusting each of said members.

Still another object is the provision of a separate control mechanism for each phase of the circuit, each of these control mechanisms being operable independently of the others to effectually preclude the opening or closing of the circuit until certain predetermined conditions in the line have been attained, as, for instance, to avoid the possibility of opening or closing the switch in any particular phase except at that instance during the current cycle when the current is zero.

Other objects of our invention will appear more fully hereinafter.

Our invention consists substantially in the construction, combination, location and relative arrangement of parts, all as will be more fully hereinafter set forth, as shown in the accompanying drawings, and finally pointed out in the appended claims.

Referring to the accompanying drawings:—

Figure 1 is a partly diagrammatic, partly perspective view showing our invention as applied to a three phase system, the arrangement being operable to open the circuits upon the development of some disturbance in the line.

Fig. 2 is a view in longitudinal section on the line 2—2 of Fig. 1 showing the manner of connection between the flywheel of the operator and the shaft on which the tripping cams are mounted.

Fig. 3 is a view on the lines 3—3 of Fig. 2 showing the graduated dial for relatively adjusting said flywheel and shaft to adjust for time lag therebetween.

Fig. 4 is a detail view in section showing the manner of securing the tripping cams to the shaft.

The same part is designated by the same reference numeral wherever it occurs throughout the several views.

Figure 10:
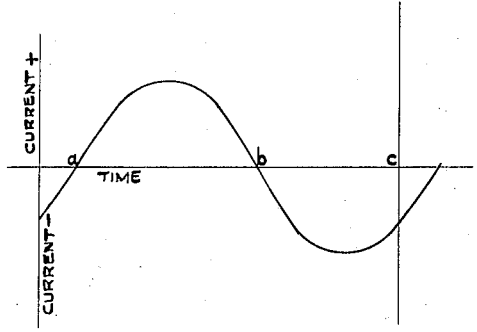
Fig. 10 is the current cycle showing those points when the current is of zero value.

Referring first to Fig. 10 in which is shown the current cycle, it will be apparent that at instances $a$ and $b$ the current passes through zero, that is, there is no current at all in the circuit. It follows, therefore, that the occurrence of sparking at the contacts and other disturbances in the circuit are eliminated when the circuit is interrupted at instances $a$ or $b$. And, as has already been pointed out, if the instance at which the circuit is established is either $a$ or $b$ or some other time when there are no disturbing transients present, then there will be no jar on the system.

The elements which make our invention possible are a combination of a synchronous operator, an inertial system or dialing system, a cam and trigger mechanism, a control or release mechanism and a circuit making or breaking mechanism. The purpose of the synchronous operator is to provide definite sequences of mechanical position which bear a direct relation to the phase of the current to be operated upon. This function may be performed by a synchronously revolving element such as a synchronous motor, an oscillating element as a Kapps oscillator, or a vibrating element the position of the moving element of which is a function of the actuating current. We prefer to use a synchronous operator and in the following such an operator is described, but it is to be understood that any of the other types can be made to serve the same purpose.

Inasmuch as the current time phase relation to the voltage may change depending upon circuit conditions and that the synchronous operator must take cognizance of this condition, the driving current of this synchronous operator must come from the line directly, or through a circuit in which the phase relation is reflected. For instance, in the latter case a current transformer may be connected to the line which it interrupts or operates upon. However, it might be that the line current is of insufficient strength to drive the synchronous operator and resort must then be made to an automatic switch which closes the synchronous operator or motor to a constant potential source.

Polyphase synchronous motors have stators which are exactly the same as those of induction motors and consequently they may be made self starting by merely adding a squirrel cage winding to the rotor. Or, the motor may have a polarized rotor consisting of a permanent magnet mounted in the rotor of the usual induction motor. Still again, the same effect may be accomplished by removing from the rotor of an induction motor a few bars at the proper points of the circumference and in each case, the machine will start up as an ordinary induction motor, either single or polyphase. After synchronism is reached or after the motor has attained sufficient angular velocity the auxilliary starting winding is automatically disconnected, thus permitting the motor to be operated by the current which it is intended to control. With this arrangement a maximum and minimum current will always occur at a fixed position particular to a certain instant for the revolving armature.

Referring now to Figure 1 the synchronous operator 10 (in this instance preferably a synchronous motor) is connected to the circuit A which is to be controlled through a potential transformer 11. Included in the secondary circuit of transformer 11 is the automatic switch 12 operable by a solenoid 13 which will be presently referred to. The switch 12 is adapted to normally maintain the said secondary circuit closed so that a starting e. m. f. is supplied to the terminals 14 of the synchronous motor. The solenoid 13 is connected in series with a second set of terminals 15 on the motor through a current transformer 16 and when the motor has reached synchronous speed or after it has attained sufficient angular velocity to pull itself into synchronism the solenoid 13 is energized to open the switch 12 whereupon the auxilliary starting winding (not shown) is disconnected leaving the motor controlled by the current which it is intended to control.

Secured to one end of the motor shaft 17 is a flywheel 18 to supply sufficient energy to operate the control mechanism to be described hereinafter. A timing shaft 19 extends longitudinally of and in alignment with the shaft 17 of the motor and is supported by suitable bearing pedestals none of which are shown. This timing shaft is preferably connected to the motor flywheel 18 through the interposition of a dial element 20 to which it is rigidly secured, as shown in Figs. 1 to 3. It will be seen that studs 21 are provided in that face of the flywheel which is away from the motor and on these studs the dial 20 is adapted to be mounted by means of threaded cap nuts 22 which securely hold the dial against the face of the flywheel. Provision is made for relative angular adjustment between the shafts 17 and 19 by forming arcuate slots 23 in the dial member 20 through which project the studs 21. A quadrant of the dial is provided with graduations 24 so that the dial may be accurately indexed with respect to the mark 25 on the periphery of the flywheel. It will thus be understood that should compensation for time lag be desired it becomes only necessary to shift the dial 20 any desirable extent within the limits of the slots 23 to effect the proper relation between the shafts 17 and 19. It is, of course, understood that other suitable time lag compensating means may be employed for effecting this relation between the synchronous operator and the mechanisms for controlling the circuit.

As has already been mentioned, we have shown our invention in connection with a polyphase system, in this instance a three phase system. Accordingly, we have shown three cam members 26, 27 and 28, suitably spaced from each other and each secured to the timing shaft in the manner best shown in Fig. 4. These cam members are exactly alike in that each is provided with contacting points 29—29 and with an offset collar 30 through which works a set screw 31 for engagement with the shaft 19. The provision of this collar and set screw is preferable because it permits individual angular adjustment of the several cam members upon the timing shaft. In the instant embodiment of our invention the cams 26, 27 and 28 are angularly disposed on the shaft 120° apart, this being best shown in Fig. 1.

Figure 8:
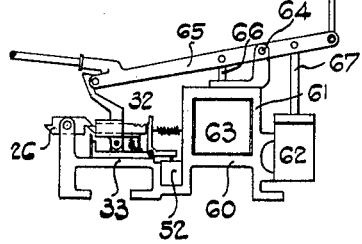
Fig. 8 is a general view in side elevation showing our control mechanism in operative engagement with the usual circuit breaker mechanism.

Disposed transversely of the shaft 19 and opposite the cams 26, 27 and 28 are respectively mounted in any suitable manner a set of control mechanisms indicated generally by the reference numeral 32. Preferably these control mechanisms are mounted directly on the frame of the usual circuit breaker as is shown in Fig. 8.

Figure 5:
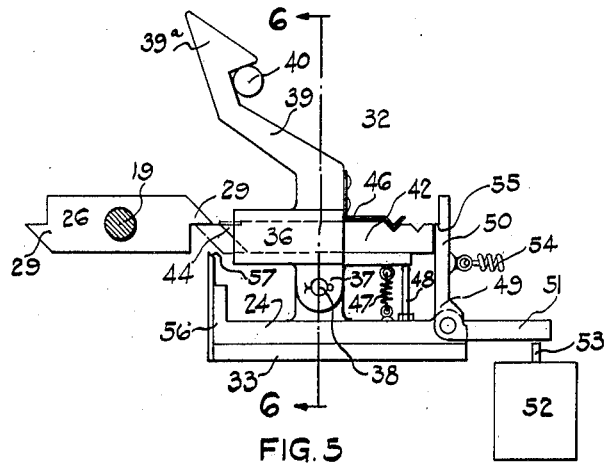
Fig. 5 is a view in side elevation showing the relative arrangement of the elements comprising the control mechanism for a single phase.
Figure 6:
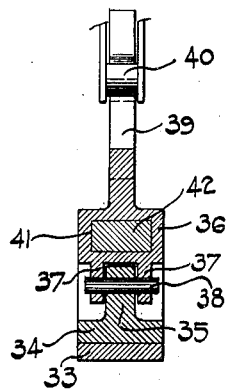
Fig. 6 is a view in section on the line 6—6 of Fig. 5 looking in the direction of the arrows.
Figure 7:
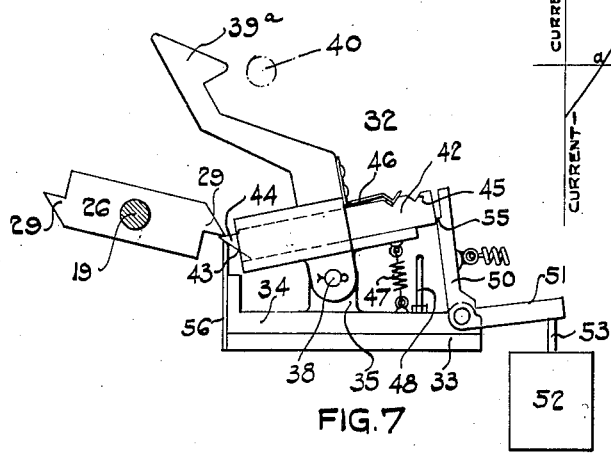
Fig. 7 is a view similar to that of Fig. 5 except that it shows the mechanism in tripped position with the cam still in engagement with the forward end of the trigger.

Inasmuch as these control mechanisms are alike in all their details only that one will be described which is operated upon by the cam 26. Referring now to Figs. 5, 6 and 7, the control mechanism comprises a table 33 upon which is mounted the base 34 carrying the upstanding pivot pin support 35, the latter being located preferably centrally of the base 34. Both the table 33 and the base 34 are relatively fixed in position by securement to the circuit breaker frame mentioned above. Oscillatably mounted above the base 34 is the trigger carrier 36 having the depending arms 37—37 which straddle the pin support 35. Suitably aligned apertures are provided in the support 35 and arms 37 through which passes a pin 38, thus providing a pivotal support for the trigger carrier 36. Preferably formed integrally with this carrier 36 is the upwardly extending arm 39 having a hook 39ª adapted to engage the handle 40 of the circuit breaker for a purpose to be hereinafter described.

The main body of the trigger carrier is provided with a longitudinally extending opening 41 preferably rectangular in form in which is slidably mounted the trigger 42. The forward end of this trigger is bevelled on its under surface as at 43 and provides an end 44 the upper surface of which is engageable by either of the points 29—29 of the cam 26. The rear end of the trigger 42 is provided in its upper surface with a pair of grooves or notches 45 in either of which (depending on whether the trigger is in projected or retracted position) the free end of a leaf spring 46 is adapted to be seated. This spring 46 may be secured to the carrier 36 in any suitable manner, the preferred method being shown in Figs. 5 and 7, and prevents relative movement of the trigger with respect to the carrier except when acted upon as will be described hereinafter.

Extending rearwardly of the carrier is a shelf-like projection, preferably formed integral therewith, to which is secured the spring 47. The other end of this spring is secured to the base 34 whereby the carrier is normally held in the horizontal position shown in Fig. 5. To preclude any possibility of drawing the rear end of the trigger out of this normal horizontal position there has been provided an upwardly extending adjustable stop element 48, this latter being preferably secured to the base 34 in the manner shown.

Mounted upon the rear end of the base 34 in any suitable manner is a bell crank 49 having the arms 50 and 51. A solenoid 52 is positioned immediately below the arm 51 of the bell crank in such manner that upon actuation of the plunger 53 through energization of the solenoid the arm 51 will be lifted with the consequence that the other arm 50 will be carried forwardly against the rear end of the trigger 42. Means are provided for returning the bell crank to normal inoperative position, this means being either the employment of a light spring 54 to retract the arm 50 or by making the arm 51 sufficiently heavy to permit its dropping of its own weight upon retraction of the plunger 53, the solenoid 52 being normally in deenergized condition. A shoulder 55 is formed in the free end of arm 50 of the bell crank for a purpose to be presently described.

A striker plate 56 having a bevelled upper end 57 complemental to the bevelled fore end 43 of the trigger is secured to the forward face of the base 34. This striker plate serves the purpose of automatically resetting the trigger after the latter has been actuated by the cam point 29 engaging the end 44 of the trigger. Thus, as is most clearly shown in Fig. 7, when the point 29 of the cam engages the end 44 of the trigger the said end is forced downwardly against the bevelled upper end of the striker plate. Because both striker plate and trigger end are complementally bevelled further downward movement of the fore end of the trigger results in a sliding movement thereof rearwardly until it has so progressed rearwardly a sufficient distance to permit free passage of the cam 26 as the latter rotates with the timing shaft 19. When the trigger is thus entirely retracted its rear end seats upon the shoulder 55 with the result that the trigger is maintained in inclined position out of the path of the cam 26 until that time when the solenoid 52 becomes deenergized whereupon the arm 50 of the bell crank is withdrawn from engagement with the trigger 42 to allow the latter to resume its normal horizontal position.

Figure 9:
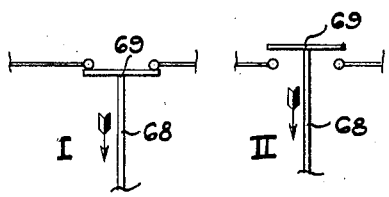
Fig. 9 shows the relative arrangements of the circuit breaking or making elements, respectively, (left to right).

Figure 8 shows the application of the control mechanism 32 to a circuit breaker indicated generally by the reference numeral 60. This circuit breaker is of the usual type and comprises the frame 61 which suitably carries the remote control solenoid 62 and the overload release solenoid 63, the action of both of which are well understood in the art. Pivotally secured at the point 64 to the top of the frame 61 is the breaker arm 65, the latter being suitably connected to the solenoids 62 and 63, respectively, by the arms 66 and 67. The extreme rear end of the breaker arm has attached to it the rod 68 which carries at its free end a bridging element 69 for breaking or making the circuit as the case may be. In Fig. 9 character I indicates that arrangement whereby the bridging element interrupts the circuit as the rod 68 is lowered, while character II indicates a somewhat similar arrangement whereby the bridging element establishes the circuit as the rod 68 is lowered.

The operation of the control mechanism will now be understood. As is clearly shown in Fig. 1, the several control solenoids 52 are each connected to one of the phases of the system by a current transformer 70, this latter being responsive to short circuits, overloads, or any other predetermined circuit condition. In a similar manner each solenoid 62 of the circuit breaker 60 is connected to a phase of the system (these connections not shown) so that upon the happening of any one of the disturbances or conditions mentioned above the solenoid will become energized whereupon it will tend to pull the rod 67 downwardly to either break or make the circuit through the arm 68 and its associated bridging member 69. However, the rod 67 will not be withdrawn so long as the hook 39ª of the carrier arm 39 is in engagement with the handle 40 of the circuit breaker arm. Nor will this engagement be broken except at those instances during the current cycle when the current is zero, or some other predetermined value.

So long as there is a current supply to the system the synchronous motor 10 operates to impart a continuous rotating movement to the timing shaft 19 through the interconnected flywheel 18 and dial 20. By reason of their positive securement to the shaft 19 the cams 26, 27 and 28 rotate therewith, there being a lag of 120° between each of the cams as has already been mentioned. When the conditions in the circuit are normal so that the solenoid 52 is deenergized the trigger 42 is maintained in its retracted position by the leaf spring 46 and the carrier is held in horizontal position by the spring 47 against the stop 48. In this position the hook end 39ª of the arm 39 is in engagement with the handle 40 of the forward end of the breaker arm 65 to maintain the circuit intact and the tripping cam is free to rotate without interception by the forward end of the trigger 42.

Now suppose that one of the undesired conditions is existing in the circuit, as for instance an overload. Immediately the solenoid 62 becomes energized with the result that it tends to draw the rear end of the breaker arm 65 downwardly to break the circuit. However, at this instant the current may be of considerable value (as at point c in Fig. 10) and if the circuit were broken then there would be considerable sparking and possibly other resulting damage to the apparatus. But the breaking of the circuit at this instant c is prevented by reason of the engagement of the hook 39ª with the handle 40 of the breaker arm. Simultaneously with the energization of the solenoid 62 occurs the energization of the control solenoid 52 with the result that the bell crank 49 is rocked about its pivot to project the trigger 42 forwardly into the path of the rotating cam 26. The forward position of the trigger is shown in dotted lines in Fig. 5 and in this position the spring 46 is in engagement with the rear notch 45 of the trigger to maintain the latter in its operative position.

By proper use of the timing dial 20 the cams are so adjusted that the instants at which they respectively strike the forwardly projected triggers 42 are those of zero current. Accordingly, as shown in Fig. 5, the cam 26 engages the forward end of the trigger 42 at the instant when the current is passing through zero. Further rotation of the cam pulls the trigger and its carrier into the inclined position shown in Fig. 7 with the result that the hook 39ª is disengaged from the handle 40 of the breaker arm to permit actuation of the latter under the influence of the overload release solenoid 63. By means of the timing dial and individually adjustable cams the operations are timed so that the breaker arm is released at or very near the instant of zero current with the consequence that all tendency to spark at the contacts is eliminated. Or, in other words, the cam will trip the hooked arm 39 only for a fixed time relation with respect to the cycle of current, this depending upon the relation of the cam to the trigger mechanism and the position of the rotor of the synchronous operator with respect to the current cycle, all of which are relatively adjustable.

The means for automatically resetting the control mechanism has already been explained. Suffice it to say that the lower bevelled surface 43 of the trigger 42 slidingly engages the bevelled end 57 of the striker plate 56. This results in a backward movement of the trigger into its carrier until the forward notch 45 is engaged by the free end of the spring 46. At practically the same time the rear end of the trigger is engaged by the shouldered arm 50 of the bell crank 49, thus precluding the possibility of effecting a series of partial operations. When the disturbance in the circuit is removed and the solenoid 52 is deenergized the bell crank 49 is returned to its normal inoperative position either by the spring 54 or by reason of the weighted arm 51. Return of the bell crank to normal position permits a resetting of the control mechanism by engaging the hooked end 39ª of the arm 39 over the handle 40 of the breaker arm 65. It is, of course, to be understood that the action with respect to cams 27 and 28 and their respective associated control mechanisms is exactly similar to that described in connection with cam 26.

From the foregoing description it will be seen that we have provided an efficient apparatus which effectually precludes the opening of any circuit until some predetermined time in the current cycle when the current conditions are favorable to circuit interruption without sparking or other objectionable disturbances. Not only is this apparatus adapted to open the circuit at certain predetermined instances, but it is also adapted to close the circuit when the circuit conditions are most favorable. It merely becomes necessary to slightly modify the arrangement of the bridging element or shoe 69 as shown in Fig. 9 to effect either this opening or closing operation. The dialing system which has been provided allows for a simultaneous relative movement of the several cams (when more than a single control mechanism is used) with respect to the position of the rotor of the synchronous operator so that an extremely fine adjustment may be had as to when the circuit breaker arm is to be released. The respective cams are also adjustably secured to the timing shaft to increase this relative adjustability and to obtain that maximum of selectivity which is always to be desired.

It should be understood that the particular structure shown is for the purposes of illustration only and that various other structures may be devised which embody our invention and which come within the spirit and scope of the appended claims.

What we claim as new and useful is:—

1. In a circuit controlling system operatively associated with said operator, of the character described, the combination of a synchronous operator, an inertial system, a cam and trigger mechanism, a control mechanism, including an arm arranged to be moved out of normal position upon engagement between said cam and trigger, and a circuit making and breaking mechanism inoperative when said arm is in normal position.

2. In an alternating current circuit controlling system, a circuit breaker device, means normally in engagement with said circuit breaker device, a continuously operating element having definite sequences of mechanical position bearing a direct relation to the phase of the current to be operated upon, and means actuated by virtue of certain predetermined conditions in said system for interconnecting said circuit breaker engaging means and said continuously operating element whereby to disengage said engaging means from said circuit breaker device.

3. In an alternating current switch of the character described, means for opening and closing a circuit, and a control mechanism for controlling the operation of said means, said control mechanism including an oscillatably mounted arm for engaging said means.

4. In an alternating current switch for making or breaking a circuit during the current cycle when the current is of substantially zero value, means for opening and closing a circuit, and a control mechanism for controlling the operation of said means, said control mechanism including an oscillatably mounted arm for engaging said means together with a synchronously operated element for effecting disengagement of said arm at certain predetermined instances in the current cycle.

5. In a switch of the character described, a synchronously operated control mechanism for said switch comprising a base, an arm mounted on said base and adapted for engagement with said switch, a continuously operating member, and means adapted to be projected into the path of said operating member whereby to effect disengagement of said arm from said switch.

6. In a switch of the character described, a synchronously operated control mechanism for said switch comprising an oscillatably mounted arm for engagement with said switch, a continuously rotating member adjacent said arm, and means carried by said arm and adapted to be projected into the path of movement of said rotating member.

7. In a switch for making or breaking a circuit during the current cycle when the current is of substantially zero value, a control mechanism therefor comprising a synchronously operated cam member, an oscillatably mounted switch engaging arm arranged substantially in the plane of movement of said cam member, and electromagnetically operated means traversing said arm and arranged to be engaged by said cam member to permit operation of said switch only at certain predetermined instances during the current cycle.

8. In a switch of the character described, in combination, a synchronous operator, a shaft rotated by said operator, a cam fixed to and rotatable with said shaft, an oscillatably mounted arm for engaging said switch disposed adjacent said shaft, and electromagnetically operated means adapted to interconnect said cam and said arm to disengage the latter from said switch.

9. In a switch of the character described, in combination, a synchronous operator, a shaft rotated by said operator, a cam fixed to and rotatable with said shaft, an oscillatably mounted arm for engaging said switch disposed adjacent said shaft, and means for effecting relative angular adjustment of said shaft with respect to said operator.

10. In a switch control system of the character described, in combination, a circuit breaker for each phase of a polyphase system, actuating means for each circuit breaker, a synchronous operator, a timing shaft rotated by said operator, a plurality of members respectively engaging the actuating means of said circuit breakers to normally maintain them inoperative, a plurality of cam members angularly disposed on said shaft, and electromagnetically operated means adapted to be projected into the paths of said cam members whereby to disengage said members from the actuating means of said circuit breakers in accordance with predetermined conditions existing in the system.

11. In a switch control system of the character described, in combination, a circuit breaker for each phase of a polyphase system, actuating means for each circuit breaker, a synchronous operator, a timing shaft rotated by said operator, a plurality of members respectively engaging the actuating means of said circuit breakers to normally maintain them inoperative, a plurality of cam members angularly disposed on said shaft, and electromagnetically operated means adapted to be projected into the paths of said cam members whereby to disengage said members from the actuating means of said circuit breakers in accordance with predetermined conditions existing in the system, and means for effecting relative angular adjustment between said shaft and said synchronous operator.

12. In a switch control system of the character described, a circuit breaker, means normally preventing operation of said circuit breaker, a synchronously operating member, and a member carried by said means adapted for rectilinear movement into the path of said synchronously operating member whereby to render operable said circuit breaker.

13. In a switch control system of the class described, a circuit breaker, means normally preventing operation of said circuit breaker, a synchronously operating member, means adapted to be projected into the path of said synchronously operating member whereby to render operable said circuit breaker, and means for automatically resetting said projectable means.

14. In a switch control system of the character described, a circuit breaker provided with means normally preventing operation thereof, a rotating cam member, a trigger carried by said means, an electromagnet for projecting said trigger into the path of movement of said cam member whereby to permit operation of said circuit breaker, and means for effectually precluding further projection of said trigger into the path of said cam member.

15. An alternating current switch comprising a base, an arm pivotally mounted upon said base, a member arranged for rectilinear movement through the body of said arm, and synchronously operating means arranged to engage the forwardly projecting portion of said member whereby to oscillate said arm out of normal position.

16. An alternating current switch comprising a base, an arm pivotally supported upon said base, said arm being provided with means at its upper end for engagement with a circuit breaker to render the latter inoperative, a movable member arranged in the lower portion of said arm, means operative upon the establishment of predetermined conditions in the circuit to move said member transversely of said arm, and synchronously operating means arranged to engage the forward end of said member whereby to effect separation of said arm from said circuit-breaker.

17. An alternating current switch comprising an oscillatably mounted arm normally in engagement with a circuit breaker to render the latter inoperative, said arm being provided with a transversely extending bore, a member disposed within said bore and arranged for movement longitudinally thereof, and means operatively associated with said member at one end thereof to effect said longitudinal movement, said means being operative upon the establishment of certain predetermined conditions in the circuit.

18. An alternating current switch comprising an oscillatably mounted arm normally engageable with a circuit breaker to render the latter inoperative, a trigger member traversing the lower portion of said arm, a continuously operating cam member disposed to one side of the forward edge of said member, means for retaining said member in retracted position, and means operative upon the establishment of certain predetermined conditions in the circuit to project said member forwardly into contacting relation with said cam member.

19. An alternating current switch comprising a base, an arm pivotally supported thereon and arranged normally to engage a circuit controlling mechanism, said arm being provided with a transversely extending passage, a slidable member disposed within said passage, means at the rear end of said member for projecting the same forwardly of said arm, and means on said base and cooperating with the forward end of said member to automatically cause the retraction of said member into said passage.

20. In an alternating current circuit controlling mechanism, in combination, a continuously rotating cam member operating in synchronism with the current in the line, a circuit making and breaking mechanism, and means arranged for movement into and out of locking engagement with said mechanism, said means including a trigger operative upon the establishment of predetermined conditions in the line for engagement by said cam member.

21. An alternating current switch including a base, an arm pivotally supported upon said base and extending substantially vertically thereabove, a substantially horizontally disposed member traversing the lower body of said arm, means arranged to move said member forwardly of said arm, and means arranged to automatically return said member to its normal position.

22. An alternating current switch including a base, an arm oscillatably mounted thereon, said arm being provided with a passage extending laterally therethrough, a longitudinally shiftable member operable within said passage, a bell crank pivoted upon said base and engaging the rear end of said member, and electro-magnetically operated means for actuating said bell crank whereby to project said member forwardly through the passage.

23. An alternating current switch including a base, an arm oscillatably mounted thereon, said arm being provided with a passage extending laterally therethrough, a longitudinally shiftable member operable within said passage, the forward end of said member being bevelled, means operatively associated with and arranged to actuate said member whereby to move said arm out of normal position, and means extending vertically above said base and engageable with the bevelled end of said member to effect its withdrawal into said passage.

In testimony whereof we hereunto affix our signatures.

FREDERICK W. LEE.
MYRICK W. PULLEN.